United States Patent [19]
Hibbard

[11] Patent Number: 5,198,648
[45] Date of Patent: Mar. 30, 1993

[54] CODE SENSOR WITH MULTI-FACETED REFLECTOR FOR SENSING PLURAL IMAGE DISTANCES

[75] Inventor: Robert H. Hibbard, Fairport, N.Y.
[73] Assignee: Eastman Kodak Company, Rochester, N.Y.
[21] Appl. No.: 634,638
[22] Filed: Dec. 27, 1990
[51] Int. Cl.$^5$ .............................................. G06K 7/10
[52] U.S. Cl. ..................................... 235/462; 359/852
[58] Field of Search ............... 235/439, 462, 467, 472, 235/454; 359/193, 196, 205, 208, 216, 439, 546, 850, 852

[56] References Cited
U.S. PATENT DOCUMENTS

| | | | |
|---|---|---|---|
| 3,676,645 | 7/1972 | Fickenscher et al. | 235/467 |
| 4,136,671 | 1/1979 | Whiteford | 359/852 X |
| 4,500,776 | 2/1985 | Laser | 235/462 |
| 4,766,300 | 8/1988 | Chadima, Jr. et al. | 235/462 |
| 4,818,886 | 4/1989 | Drucker | 235/462 |
| 4,843,222 | 6/1989 | Hochgraf | 235/462 |
| 4,877,949 | 10/1989 | Danielson et al. | 235/462 |
| 4,896,029 | 1/1990 | Chandler et al. | 235/494 |
| 4,967,074 | 10/1990 | von Stein | 235/467 |
| 5,010,241 | 4/1991 | Butterworth | 235/462 |

FOREIGN PATENT DOCUMENTS
62-32580 2/1987 Japan ................................ 235/462

Primary Examiner—John W. Shepperd
Assistant Examiner—Edward H. Sikorski
Attorney, Agent, or Firm—Edward Dugas

[57] ABSTRACT

A bar code scanner having a lens, a reflector, a sensor, and a detection unit. The lens is arranged to focus an image of a bar code to be scanned along an image path. The reflector is angled obliquely to the image path so as to reflect images at an angle to the image path. The reflector has reflector surface shaped so as to provide a plurality of reflected images of the scanned bar code, with one of the reflected image being an in-focus image and a remainder of the reflected images being out-of-focus images. The sensor is in the image path and simultaneously senses the plurality of reflected images and provides a sensor output signal corresponding to the sensed images. The detection unit is coupled to the sensor and decodes the sensor output signal and provides a bar code output signal that corresponds to the scanned bar code.

12 Claims, 3 Drawing Sheets

CODE SENSOR WITH MULTI-FACETED REFLECTOR FOR SENSING PLURAL IMAGE DISTANCES

FIELD OF THE INVENTION

The present invention relates to scanners for bar codes, and more particularly, to bar scanners that have a large depth of field.

BACKGROUND OF THE INVENTION

Bar code scanners that use lasers have relatively large depths of field due to the highly collimated nature of the laser. Since the scanning beam which carries the information is so well defined, these bar code scanners are able to use a single element sensor as opposed to an array.

One of the problems with the bar code scanners that use lasers is their relatively high cost, due to the laser diode that is required. A less expensive approach to bar code scanning is provided by using a linear array of light sensitive elements, such as a charge coupled device (CCD) array. These bar code scanners avoid using a laser, but such scanners have in the past had very limited depths of field, with a typical maximum range of approximately one to one and a half inches.

There is a need for a relatively inexpensive bar code scanner that still provides a large depth of field.

SUMMARY OF THE INVENTION

This and other needs are met by the present invention which provides a bar code scanner comprising a lens, a reflector, a sensor, and a detection unit. The lens is arranged to focus an image of a bar code to be scanned along an image path. The reflector is angled obliquely to the image path so as to reflect images at an angle to the image path. The reflector has a reflector surface shaped so as to provide a plurality of reflected images of the scanned bar code, with one of the reflected images being an in-focus image and a remainder of the reflected images being out-of-focus images. The sensor is in the image path and simultaneously senses the plurality of reflected images and provides a sensor output signal corresponding to the sensed images. The detection unit is coupled to the sensor and decodes the sensor output signal and provides a bar code output signal that corresponds to the scanned bar code.

In certain embodiments of the present invention, the reflector is faceted in order to provide the plurality of reflected images. Since the reflector is angled, different image distances or different object distances are provided, so that one of the reflections will be in focus while the remaining images will be out of focus. In some embodiments of the present invention, the plurality of images are superimposed on a single linear array, while in other embodiments, the images are separately provided to a plurality of linear arrays.

The above-described needs; are also met by another embodiment of the present invention which provides a bar code scanner comprising a lens, a sensor, an autofocus device and a detection unit. The lens is arranged to focus an image of a bar code to be scanned along an image path. The sensor is in the image path and senses the image and provides a sensor output signal corresponding to the sensed image. The autofocus device is coupled to one of the sensor or lens and moves the sensor or lens to vary an image distance between the lens and sensor. The detection unit is coupled to the sensor and decodes the sensor output signal and provides a bar code output signal that corresponds to the scanned bar code. In another embodiment of the invention, the image distance is varied by moving a reflector that is in the image path between the lens and the scanner.

The above stated needs are also met by another embodiment of the present invention that provides a method of scanning a bar code comprising the steps of: simultaneously focusing a plurality of images of the bar code onto a sensor, this plurality of images containing an in-focus image of the bar code and a plurality of out-of-focus images; producing a sensor output signal corresponding to the plurality of images focused onto the sensor; determining the in-focus image from the sensor output signal; and decoding the in-focus image.

Another embodiment of scanning a bar code according to the present invention comprises the steps of: focusing an image of a bar code to be scanned along an image path with a lens; sensing the focused image and providing a sensor output signal corresponding to the sensed image; varying an image distance between the lens and the sensor to adjust the focus of the image using an autofocus device; and decoding the sensor output signal and providing a bar code output signal that corresponds to the scanned bar code. In certain embodiments of the invention, the step of varying an image distance includes the step of sequentially attempting to decode the sensor output signal at all focus positions and causing the autofocus device to move the lens, the sensor, or a reflector in response to results of the attempted decoding. In this way, a faster autofocusing is obtained since focusing can be stopped immediately once the focus is adequate to determine the bar code, as opposed to the precise focusing needed in photographic applications of autofocusing.

Other objects, advantages and novel features of the present invention will become apparent from the following detailed description of the invention when considered in conjunction with the accompanying drawings.

DETAILED DESCRIPTION OF THE DRAWING

Figure 1:
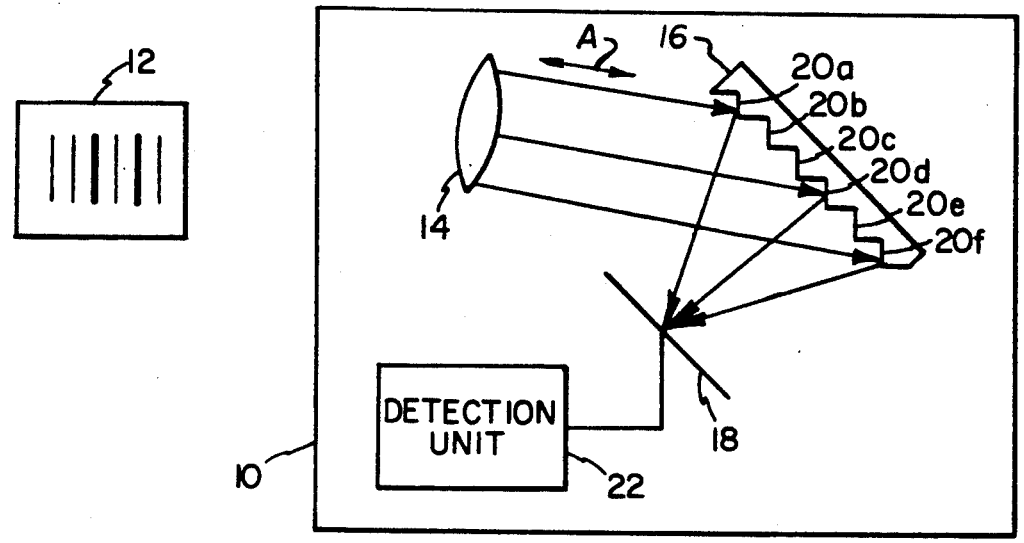
FIG. 1 shows a block diagram of a bar code scanner constructed in accordance with an embodiment of the present invention which includes a faceted reflector.

A embodiment constructed according to the present invention of a scanner 10 that is capable of scanning bar codes with an improved depth of field is illustrated in FIG. 1. The scanner 10 of the present invention avoids the use of a highly collimated laser source for a light source, with its attendant high costs, but does not sacrifice the depth of field that is ordinarily provided by the use of a laser.

The scanner 10 is capable of accurately gathering information from a bar code 12 that is positioned within a relatively deep field. The image of the bar code 12 is focussed by a lens 14 onto a multi-faceted reflector 16. The sensor 18 can be, for example, a charge coupled device (CCD) sensor, and configured as either a single linear array or a plurality of linear arrays that form a two-dimensional array. (Note that the plane of the sensor is perpendicular to the paper in FIG. 1, so that the sensor 18 is shown in FIG. 1 as a single linear array for illustrative purposes.) The output of the sensor 18 is coupled to a conventional detection unit 22 that decodes the bar code 12 from the output signals of the sensor 18.

The reflector 16 has a plurality of facets $20a$–$20f$. As can be seen in FIG. 1, the reflector 16 is oriented at an oblique angle with respect to a horizontal (or line of sight) axis A. Thus, each facet $20a$–$20f$ of the reflector 16 will be located a different horizontal distance from the lens 14 than every other facet $20a$–$20f$. For example, facet $20a$ is closer to the lens 14 than facet $20f$ as measured in the horizontal direction.

The angling of the reflector 16 so that the facets $20a$14 $20f$ are different horizontal distances from the lens 14 provides a variation in image distances (the distance an image travels from the lens 14 to the sensor 18). This variation in image distances corresponds to various object distances according to the equation: $o = i*f/(i-f)$, where (f) is the focal length of the lens, (o) is the object distance and (i) is the image distance. The magnification ratio (m) is given by the equation: $m = i/o$.

Each of the reflections off the individual facets $20a$–$20f$ are superimposed on the sensor 18, so that there are many superimposed images of the bar code 12 on the array(s) of the sensor 18. One of these images of the bar code 12 will be properly focused, while the remaining coincident images that are superimposed will be out of focus. Accordingly, the output signal of the sensor 18 will contain a signal that corresponds to the image in focus and noise that corresponds to the out-of-focus images. The sensor 18 can be a single linear array when the out-of-focus images are so far out of focus that the in-focus image can be accurately determined from the superimposed in-focus and out-of-focus signals, i.e. the contrast for the in-focus images are much higher than the out-of-focus images. If the geometries of the optics is such that the contrast for the in-focus images are not much higher than the out-of-focus images, then the sensor 18 comprises multiple linear arrays, with the images separated and focused on different ones of the linear arrays, rather than superimposing the images.

From this noisy sensor output signal, the detection unit 22 determines the signal that corresponds to the image in focus and thus reads the bar code 12. Programming the detection unit 22 to filter the noise signals from the signal of interest is easily performed by one of ordinary skill in the art.

The embodiment of the present invention shown in FIG. 1 provides a scanner that has a large depth of field by creating varying image distances using a simple and relatively inexpensive arrangement. This embodiment is mechanically ideal since the variations in the depths of the facets $20a$–$20f$ are small.

Figure 2:
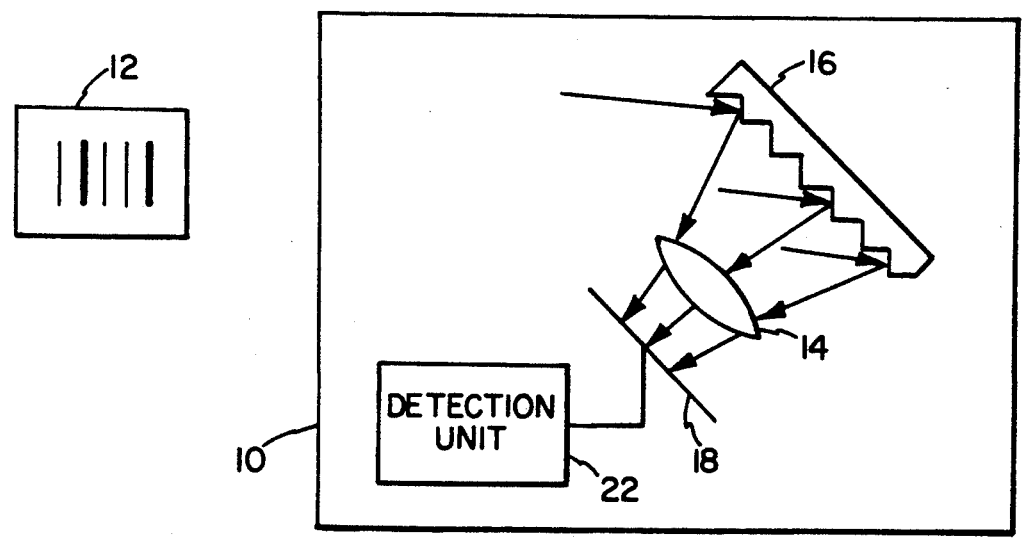
FIG. 2 shows a block diagram of a bar code scanner constructed in accordance with another embodiment of the present invention which includes a faceted reflector.

Another embodiment of the present invention which uses a multi-faceted reflector is illustrated in FIG. 2, where like reference numerals refer to like elements. The embodiment of FIG. 2 differs from that of FIG. 1 in the placement of the lens 14. Instead of being in the image path between the bar code 12 and the reflector 16, the lens 14 is arranged in the image path between the reflector 16 and the sensor 18.

The embodiment of FIG. 2 does not provide varying image distances. Rather, the embodiment of FIG. 2 varies the object distances to different depth zones while keeping the image distances (between the lens 14 and the sensor 18) constant. As in the embodiment of FIG. 1, images from the different depth zones as reflected from the different facets $20a$–$20f$ will be superimposed on the sensor 18, and the detection unit 22 determines the bar code 12 by filtering out the noise created by the superimposition of the out of focus zones.

One of the advantages of this embodiment is that there is constant magnification for in-focus images since the object distance for each depth zone is constant and the image distance is constant, so that the magnification ratio m (i/o) is constant. This is in contrast to the embodiment of FIG. 1, in which the magnification is non-constant since the image distances are variable, although the object distances were constant. However, the embodiment of FIG. 2 is mechanically non-ideal since it requires relatively large variations in the depth of the facets $20a$–$20f$ of the reflector 16.

Figure 3:
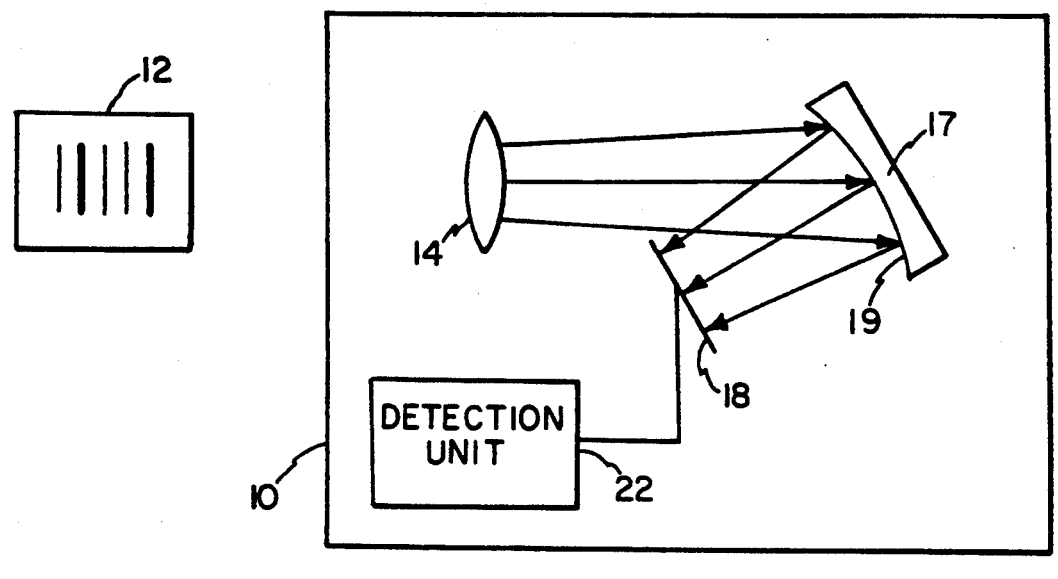
FIG. 3 shows a block diagram of a bar code scanner constructed in accordance with another embodiment of the present invention which includes a curved reflector.

Another embodiment of the present invention is illustrated in FIG. 3, which is similar to the embodiment of FIG. 1, but in which the multi-faceted reflector 16 is replaced with a curved reflector 17. This reflector 17 has a surface 19 that is curved in such a manner as to provide the function of the facets of the reflector 16 of the embodiment of FIG. 1. In other respects, the embodiment of FIG. 3 is the same as that of FIG. 1. Also, although not illustrated, the multi-faceted reflector 16 of FIG. 2 can be replaced with the curved reflector 17.

Figure 4:
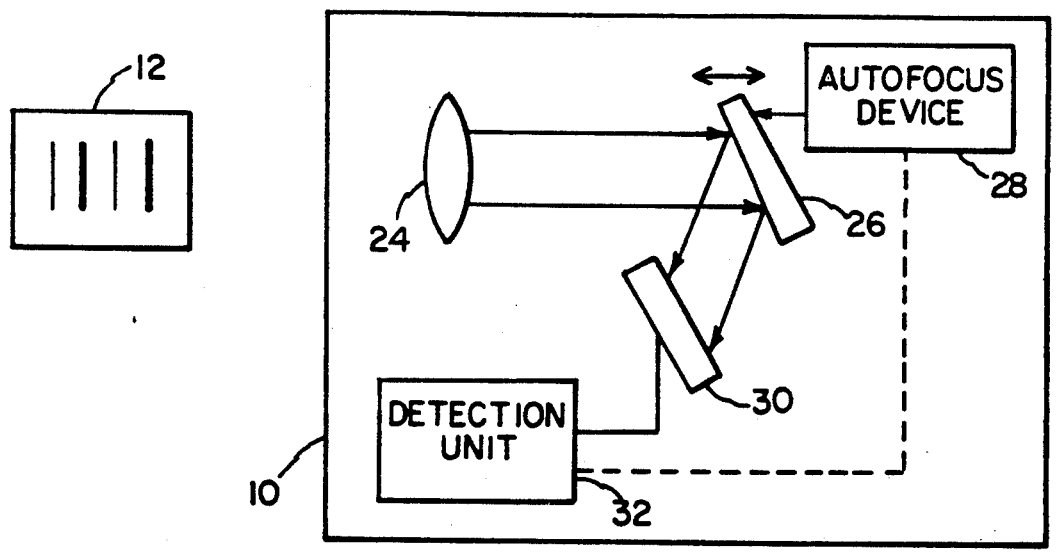
FIG. 4 shows a block diagram of a bar code scanner constructed in accordance with another embodiment of the present invention which includes a movable reflector.

A different embodiment of the present invention is illustrated in FIG. 4 that varies the image distance by moving a reflector 26. The scanner 10 of FIG. 4 has a lens 24, a movable reflector 26, an autofocus device 28, a two-dimensional sensor 30, and a detection unit 32. The autofocus device 30 is coupled to the movable reflector 26 so as to control its movement.

The autofocus device 28 is a conventional autofocus device such as the type commonly used in cameras. The autofocus device 28 can be made to operate in a number of different ways. First, the autofocus device 28 can simply measure the distance to the bar code 12 and move the reflector 26 according to a stored relationship so that the image on the sensor 30 will be in focus.

In a second method of autofocusing, the autofocus device 28 operates so as to detect an optimum focus position from image contrast.

For a third method of autofocusing, the detection unit 32 is coupled to the autofocus device 28 (indicated by the dashed line in FIG. 4). The autofocus device sequentially attempts to decode at all focus positions. The sequential decoding attempts can be made continuously or in a stepped fashion. This particular method has the advantage of providing a relatively faster focusing, since precise focusing is not needed in this environment. In other words, the autofocusing device 28 only needs to operate until the bar code 12 is focused enough to be decoded. This information is provided by feedback from the detection unit 32. This "close enough" focusing can be performed faster than a precise focus, and is adequate in this environment, unlike the photography environment in which precise focusing is required. Controlling an autofocus device 28 in this manner is well within the skill of one of ordinary skill in the art of autofocusing.

Figure 5:
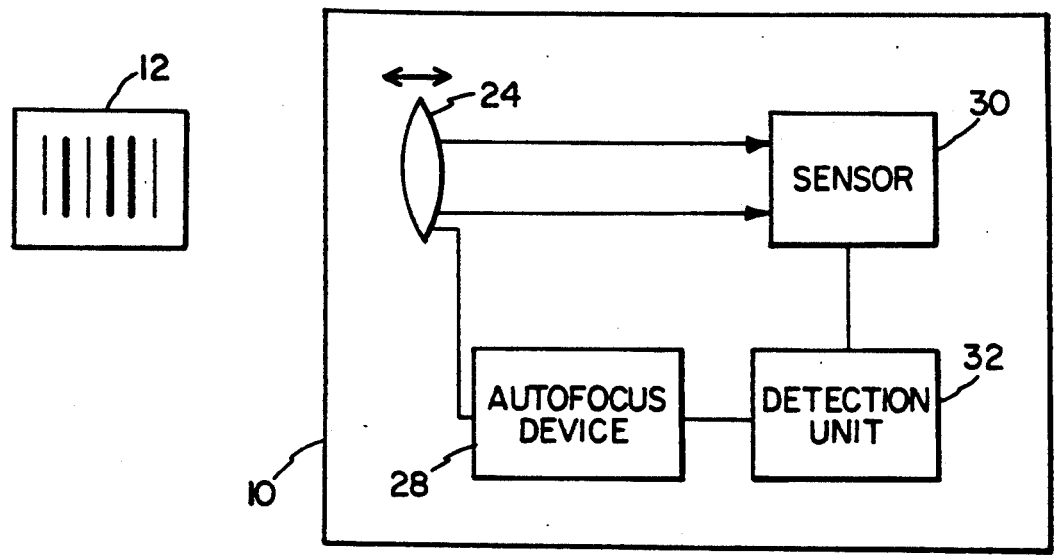
FIG. 5 shows a block diagram of a bar code scanner constructed in accordance with another embodiment of the present invention which includes a movable lens.

Another embodiment of the present invention is illustrated in FIG. 5, but does not use a reflector. Instead, the image is directly focused on the sensor 30 by the lens 24. In this embodiment, it is the lens 24 that is moved by the autofocus device 28 in order to change the focusing. This can be performed by any of the methods described with respect to FIG. 4.

Figure 6:
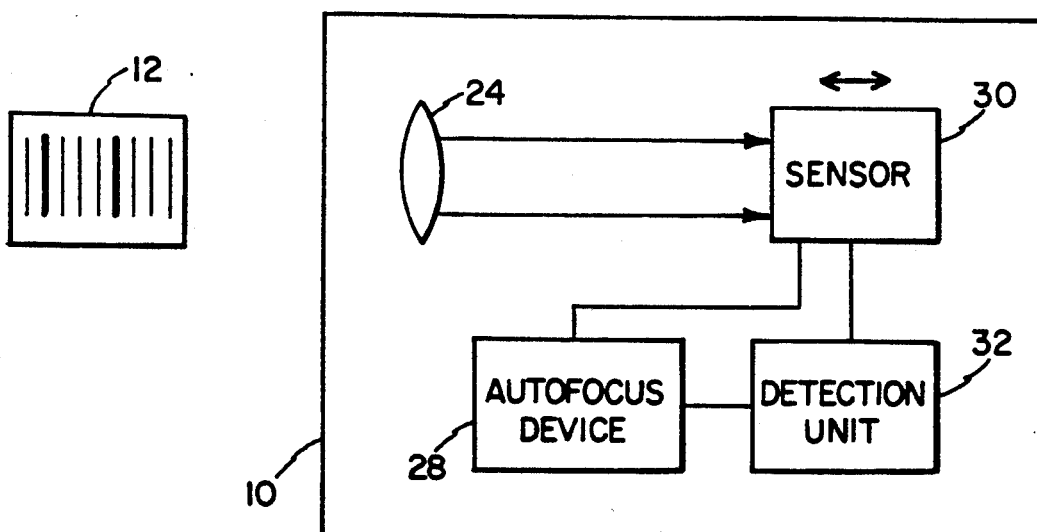
FIG. 6 shows a block diagram of a bar code scanner constructed in accordance with another embodiment of the present invention which includes a movable sensor.

In the embodiment of the present invention illustrated in FIG. 6, the autofocus device 28 moves the sensor 30, while the lens 24 remains stationary. This embodiment in other respects is the same as that of FIG. 5.

The embodiments of FIGS. 4, 5 and 6 all move an element of the scanning arrangement using an autofocus device in order to change the image distance and the focus of the scanner 10. In this way, these embodiments of the scanner 10 are able to scan a bar code 12 within a relatively deep field without the need for a highly collimated light source.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A bar code scanner comprising:
   a lens arranged to focus an image of a bar code to be scanned along an image path;
   a reflector in the image path and angled obliquely to the image path so as to reflect images at an angle to the image path, said reflector having a reflector surface shaped so as to provide a plurality of reflected images of the scanned bar code, with one of said reflected images being an in-focus image and a remainder of said reflected images being out-of-focus images;
   a single linear array sensor in the image path onto which said images are reflected and which simultaneously senses the plurality of reflected images and provides a sensor output signal corresponding to the sensed images; and
   a detection unit coupled to the sensor which decodes the sensor output signal and provides a bar code output signal that corresponds to the scanned bar code.

2. The bar code scanner of claim 1, wherein the reflector surface is shaped so as to comprise a plurality of facets.

3. The bar code scanner of claim 2, wherein the lens is positioned on the image path between the bar code to be scanned and the reflector.

4. The bar code scanner of claim 2, wherein the lens is positioned on the image path between the reflector and the single linear array sensor.

5. The bar code scanner of claim 1, wherein the single linear array sensor is a CCD sensor.

6. The bar code scanner of claim 1, wherein the detection unit includes means for filtering the in-focus image from the out-of-focus images contained in the sensor output signal and producing the code output signal from the in-focus image.

7. The bar code scanner of claim 1, wherein the reflector surface is smoothly curved so as to provide the in-focus and out-of-focus reflected images to said single linear array sensor.

8. The bar code scanner of claim 1, wherein the reflector surface is shaped so as to provide the in-focus and the out-of-focus reflected images superimposed on the single linear array sensor.

9. A method of scanning a code comprising:
   simultaneously focusing a plurality of images of the code onto a single linear array sensor, said plurality of images containing an in-focus image of the code and a plurality of out-of-focus images;
   producing a single linear array sensor output signal corresponding to the plurality of images focused onto said sensor;
   determining the in-focus image from the sensor output signal; and
   decoding the in-focus image to extract information.

10. The method of claim 9, wherein said step of simultaneously focusing includes the step of simultaneously reflecting separate images of the code from a reflector onto said single linear array sensor.

11. The method of claim 10, wherein the reflector is a faceted reflector and the step of simultaneously reflecting includes the step of reflecting a plurality of images from a single image with the faceted reflector.

12. The method of claim 10, wherein the separate images are superimposed by the reflector and the single linear array sensor receives said superimposed images.

* * * * *